United States Patent [19]
Pavlin

[11] Patent Number: 4,670,638
[45] Date of Patent: Jun. 2, 1987

[54] METHOD AND DEVICE FOR DISPLACING THE IMPACT POINT OF A LASER BEAM ON A PART

[75] Inventor: Cyrille F. Pavlin, Septeuil, France

[73] Assignee: Bertin & Cie, Plaisir, France

[21] Appl. No.: 918,997

[22] PCT Filed: Feb. 4, 1986

[86] PCT No.: PCT/FR86/00030

§ 371 Date: Sep. 30, 1986

§ 102(e) Date: Sep. 30, 1986

[87] PCT Pub. No.: WO86/04534

PCT Pub. Date: Aug. 14, 1986

[30] Foreign Application Priority Data

Feb. 5, 1985 [FR] France ............... 85 01586

[51] Int. Cl.$^4$ ............................................. B23K 26/02
[52] U.S. Cl. .................... 219/121 LU; 219/12 NQ; 219/121 LW
[58] Field of Search ............... 219/121 LQ, 121 LU, 219/121 LV, 121 LW, 121 LX; 350/636, 6.6, 622, DIG. 3

[56] References Cited

U.S. PATENT DOCUMENTS 3,225,206 12/1965 Strong et al. ............ 219/121 LM X
4,429,210 1/1984 Sudo et al. ................... 219/121 LW

FOREIGN PATENT DOCUMENTS 0055463 7/1982 European Pat. Off. .
2271683 5/1974 France .

Primary Examiner—C. L. Albritton
Attorney, Agent, or Firm—Dennison, Meserole, Pollack & Scheiner

[57] ABSTRACT

Method and device for displacing the laser beam on a part by means of a reflexion mirror (20) and focussing lenses (24, 26). A small amplitude motion of the mirror (20) with respect to perpendicular rotational axes crosses at its center is superposed to the motion of the part with respect to the mirror (20) - lenses (24, 26) assembly. The invention applies particularly to the control of the displacement of laser beams used for cutting, marking, and welding parts.

17 Claims, 6 Drawing Figures

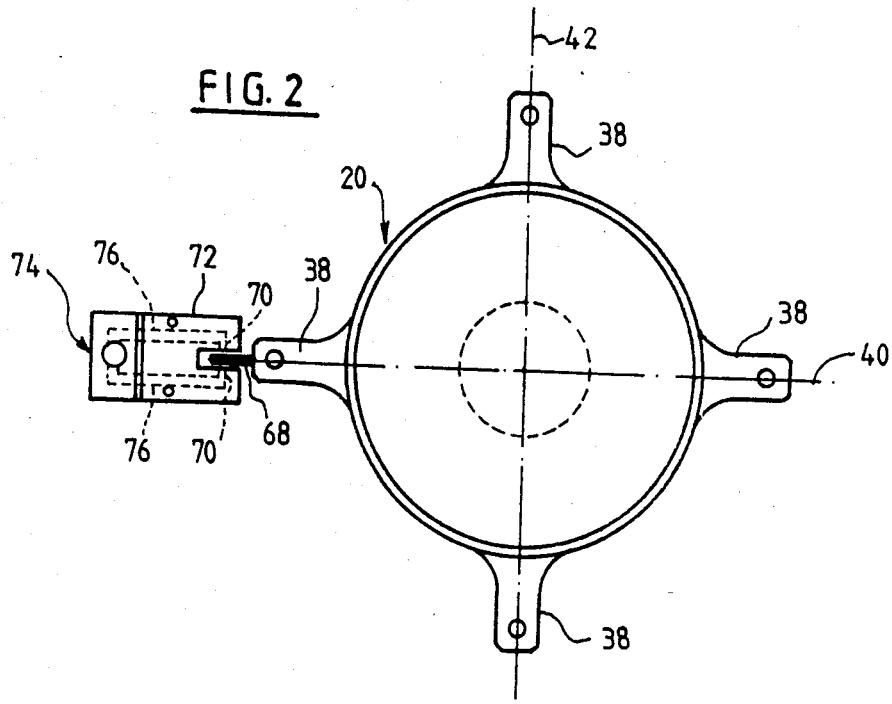
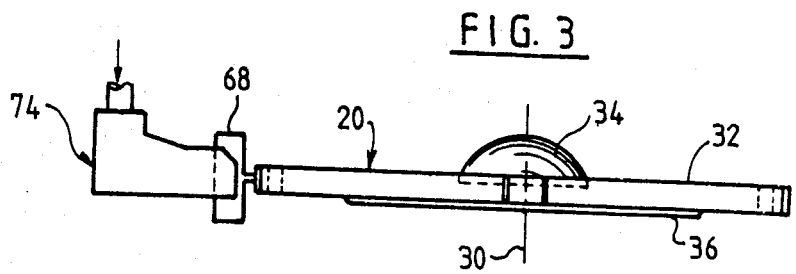
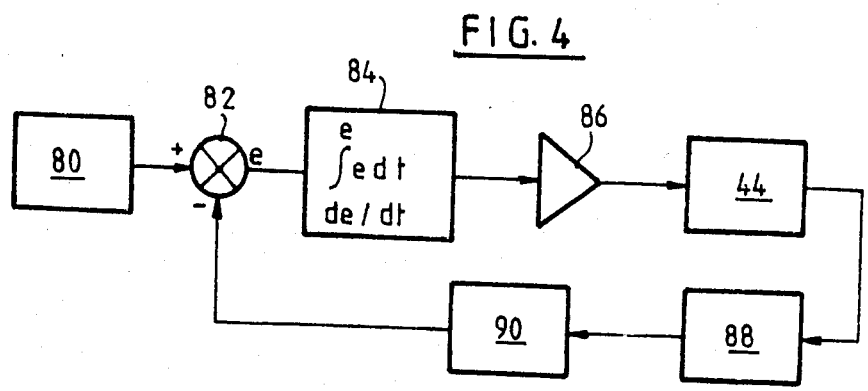

METHOD AND DEVICE FOR DISPLACING THE IMPACT POINT OF A LASER BEAM ON A PART

The invention relates to a method and to a device for displacing the impact point of a laser beam on a part.

Industrial applications of laser beams are becoming more and more numerous and diverse, with laser beams being used, in particular, for cutting, marking, welding parts, surface treatments, etc.

In general, the laser beam is directed onto a mirror which directs it to a focusing lens interposed between the mirror and the part to be treated. The impact point of the laser beam on the part is displaced along a predetermined trajectory either by displacing the mirror/-focusing-lens assembly relative to the part, or else by displacing the part and its support relative to the mirror/lens assembly.

In either case, the masses that need to be displaced are relatively large and have inertia which greatly limits the acceleration and the speed at which the laser beam may be displaced relative to the part, particularly when the trajectory of the impact point includes regions of small radius of curvature. Such slowing down gives rise to the risk of the part being burned, and also wastes time, thereby making the use of a laser beam less competitive relative to conventional cutting or marking devices.

The object of the invention is a method and a device for displacing a laser beam, which method and device do not suffer from these drawbacks and which allow the impact point of a laser beam to be displaced over a part with accelerations that are much higher than those that could be obtained previously, in particular when the trajectory of the impact point includes regions of very small radius of curvature.

Another object of the invention is a method and a device enabling a laser beam to be displaced along a predetermined trajectory with a very much higher degree of accuracy than could be obtained previously.

The method in accordance with the invention which consists in directing a laser beam onto a mirror for deflecting it onto a part, and in displacing the mirror support or the part support relative to the other support with predetermined motion corresponding substantially to the desired trajectory for the beam impact point on the part is characterized in that it consists in superposing on said motion a small amplitude motion of the mirror relative to its support, in mounting the mirror rotatable about axes which cross at its center, and in determining the small amplitude motion by rotating the mirror about said axes.

Preferably, the mirror is suspended from its center by magnetic attraction and without friction by means of a cushion of air, and its rotary motion about the above-specified axes is controlled by varying current flowing through coils which are placed in a fixed magnetic field and which are fixed on the mirror at points situated on the above-specified rotary axes.

The invention also provides a device for displacing the impact point of a laser beam on a part, the device comprising a mirror onto which the laser beam is directed together with means for displacing the mirror support or the part support relative to the other support with motion corresponding substantially to the trajectory desired for the laser beam impact point on the part, characterized in that the mirror is rotatably mounted relative to its support about two perpendicular rotary axes passing through its center, and in that means are provided for displacing the mirror about said two axes with small amplitude motion which is superposed on the above-specified motion of the mirror support or the part support relative to the other support.

The invention thus provides for an average trajectory of a laser beam impact point on a part to be determined, with said average trajectory not including portions of very small radius of curvature, and for superposing on said average trajectory a small amplitude curve of the laser beam impact point on the part in order to obtain exactly the desired trajectory for the laser beam impact point. This small amplitude displacement is obtained by rotating the reflecting mirror whose mass is very small and whose moment of inertia about its center or about the rotary axes crossing at its center is also very small. The acceleration of the laser beam impact point on the part in the small amplitude motion may be very much greater than that of its motion along the above-specified average trajectory.

A much more accurate trajectory for the laser beam over the part is thus obtained while avoiding the risk of burning and the slowdowns observed in the prior art.

The small amplitude motion which is superposed on the above-specified trajectory may be an alternating motion serving to avoid sudden cooling of a weld, or else to reduce the plasma cloud effect which tends to reduce the cutting power of the laser beam, etc.

In the following description reference is made to the accompanying drawings by way of example, in which:

FIG. 2 is a bottom view of the reflection mirror in association with a contact-free support device;

FIG. 3 is a plan view of the mirror and its support device;

FIG. 4 is a block diagram of a circuit for controlling the displacement of the reflecting mirror;

Figure 1:
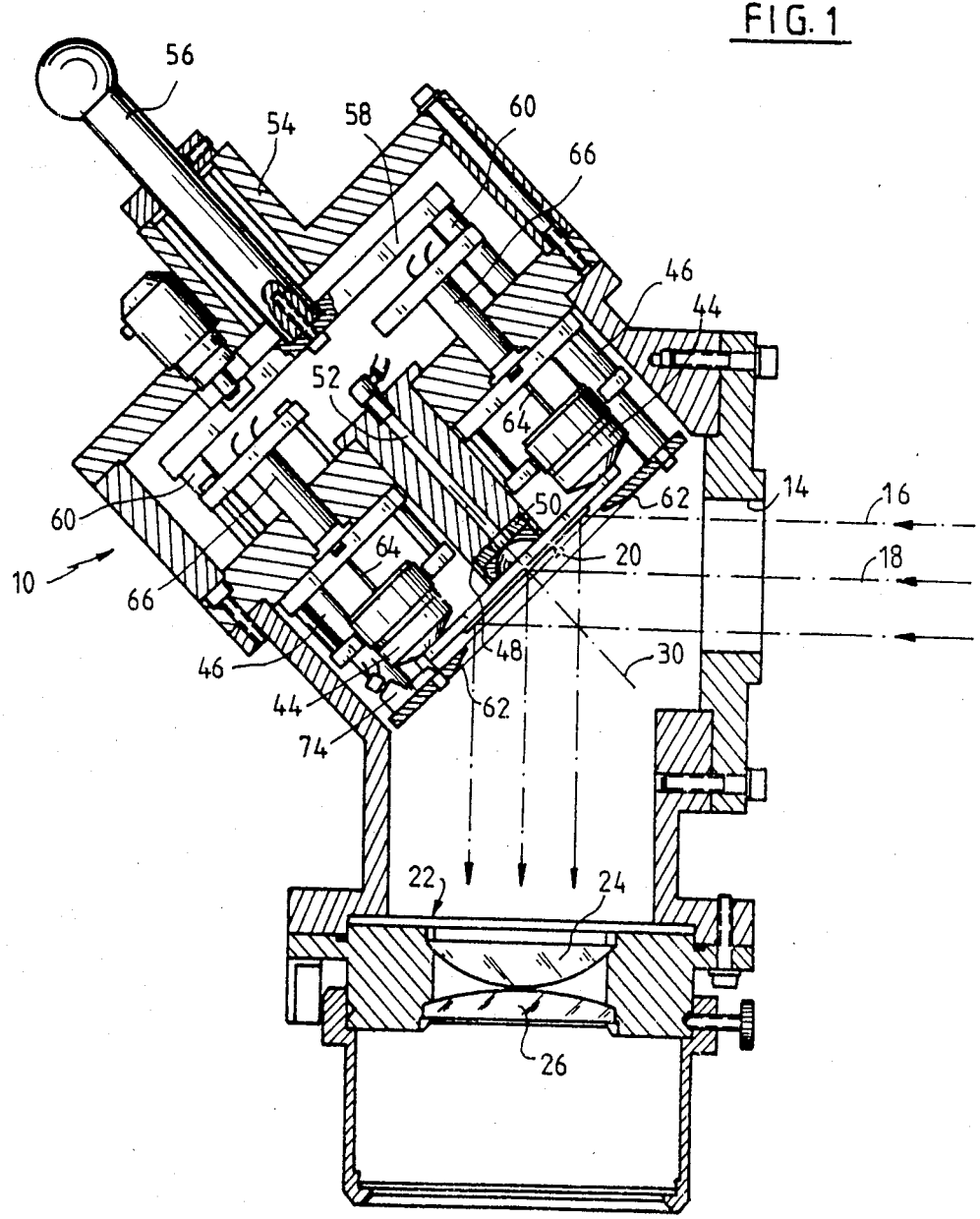
FIG. 1 is a diagrammatic axial section through a reflection-mirror/focusing-lens assembly constituting a portion of a device in accordance with the invention.

Reference is made initially to FIG. 1 which is a diagrammatic axial section through the support of a reflecting mirror and focusing lens assembly in a device in accordance with the invention.

The support comprises a frame or chassis 10 having a wall 12 with an opening 14 through which a laser beam 16 of axis 18 is directed onto a mirror 20 which is inclined at 45° to the axis 18 and which directs the laser beam to an optical focusing device 22 comprising two convex lenses 24 and 26 whose optical axis 28 is perpendicular to the above-specified axis 18. The laser beam which passes through the optical device 22 is focused by the lenses 24 and 26 onto a part (not shown) placed on a support situated underneath the optical device 22 on its axis 28. As mentioned above, an average trajectory for the laser beam impact point on the part is obtained either by displacing the part support relative to the frame or chassis 10 or else by displacing the frame relative to the part to be treated. Since the mass and the moment of inertia of the part and its support or of the frame 10 are both relatively large, the maximum acceleration of the laser beam impact point on the part cannot exceed 3 g, and this leads to displacement speeds for said impact point which may be very low if the trajectory includes portions of small radius of curvature.

In order to very considerably increase the acceleration of the laser beam impact point in the small radius of curvature portions of its trajectory, the invention provides for the reflecting mirror 20 to be rotatably mounted about two perpendicular axes which cross at its center, and which are perpendicular to an axis 30 passing through the center of the mirror perpendicularly to its optical surface.

In order to do this, the center of the rear face 32 of the mirror 20 (i.e. its face opposite to its reflecting optical face) is provided with a hemispherical steel pivot 34 whose own center coincides with the center of the optical face 36 of the mirror. The mirror also includes four radial arms 38 distributed at 90° intervals around its periphery and extending along two perpendicular axes 40 and 42 which cross in the center of the mirror and which constitute the rotary axes of the mirror.

Coils 44 having their axes parallel to the above-specified axis 30 are fixed to each of the arms 38 at equal distances from the center of the mirror. Each coil cooperates with a magnetic circuit 46 supported by the frame 10 and includes a core extending parallel to the axis 30 and engaged inside the coil 44. The two coils 44 mounted on two diametrically opposite radial arms 38 are electrically connected in opposition so that the same current passes through both coils while flowing in one direction through one of them and in the other direction through the other, thereby ensuring that the electromagnetic forces developed by a pair of diametrically opposed radial arms 38 are of equal magnitudes and of opposite directions parallel to the axis 30, thereby avoiding the application of a shear force to the mirror 30.

The mirror is suspended in the frame 10 by means of the hemispherical pivot 34 whioh is received in a cavity of complementary shape formed in the end of a central riser 48 in the frame 10, which riser comprises, in the vicinity of its end, a permanent magnet 50 (or a winding conveying an electric current) which acts on the pivot 34 by magnetic attraction. In order to avoid, or at least reduce, friction between the pivot 34 and its housing in the end of the riser 48, an axial passage 52 is formed along the riser 48 and is connected at one end to a source of compressed air (not shown) and has its other end opening out into the middle of the pivot-receiving housing, so that blowing air into said housing forms an air cushion between the pivot 34 and the inside surface of its housing, thereby very greatly reducing friction when the mirror 20 rotates about the axes 40 and 42, and simultaneously cooling the mirror if it is being used in conjunction with a high power laser beam.

The top portion of the frame 10 includes an axial sleeve 54 having a ball column 56 mounted therein and displaceable along the axis 30. The bottom end of the column 56 is connected via a plate 58 to two arms 60 whose bottom ends support a ring 62 which extends below the mirror 20 and parallel thereto. The ring 62 constitutes a shield for preventing the laser beam from impacting directly on the sensitive portions of the assembly. In addition, the column 56 can be moved along the axis 30 to press the ring 62 against the periphery of the mirror 20, thereby determining a reference position for the mirror which is inclined, at that moment, at exactly 45° relative to the axis 18 of the laser beam 16, and thus also determining reference positions for rotation sensors for sensing rotation of the mirror 20 about the axes 40 and 42.

These sensors may be of any suitable type: for example, a light ray may be applied to the mirror and reflected onto analog photo cells of the four-quadrant type. Four linear displacement inductive sensors could also be used, with each sensor being associated with one of the coils 44 and including a rod 64 which extends axially through the coil 44 and is fixed together therewith by one of its ends to the end of the corresponding arm 38 of the mirror 20. The opposite end of the rod 64 is guided in alternating rectilinear displacement inside a cylinder 66 which constitutes the fixed element of the sensor with its moving element being carried by the rod 64 inside the cylinder 66. The linear displacements of the moving elements of these sensors correspond to rotations of the mirror 20 about its axes 40 and 42.

The mirror 20 is also associated with means for preventing it from rotating about the axis 30. These means may be constituted, for example as shown in FIGS. 2 and 3, by a plate 68 carried by one of the arms 38 of the mirror 20 and extending between two facing poles 70 for blowing air onto the plate from two parallel arms 72 of a part 74 including channels 76 for feeding the holes 70 with compressed air. The air jets leaving the holes 70 strike the plate 68 perpendicularly and hold it partway between the holes 70, thereby preventing the mirror 20 from rotating about the axis 30.

The above-described device operates as follows:

The pivot 34 of the mirror 20 is suspended on the air cushion by magnetic attraction in its hemispherical housing at the end of the riser 48 from the frame 10. A variation in the electric current passing through a pair of coils 44 connected in opposition causes a variation in the electromagnetic force developed by said coils 44 on the associated magnetic circuit 46 and thus causes the mirror 20 to rotate about the axis passing through the other pair of coils 44.

Rotations of the mirror 20 about the axes 40 and 42 are of very small amplitude (not more than a few degrees) and give rise to small amplitude motions of the laser beam impact point on the part to be treated, which small amplitude motions are superposed on the average trajectory of said impact point as obtained by displacing the frame 10 relative to the part or by displacing the part and its support relative to the frame 10. The relatively small mass of the mirror, its small moment of inertia about the rotary axes 40 and 42, and the elimination of friction by means of the air cushion between the pivot 34 and its hemispherical housing enable the beam impact point to be displaced with accelerations that may reach values in the range 10 g to 30 g or even higher.

The variations in the electric currents feeding the coils 44 are preferably produced by a control circuit of the kind shown diagrammatically in FIG. 4 and comprising an analog function generator 80 whose output is connected to the positive input of a summing circuit 82. The output from the summing circuit is connected to the input of a corrector network 84 which may be of the proportional-integral-derivative type, for example, and whose output is connected via an amplifier 86 to the coils 44. The output from the coils is connected to the negative input of the summing circuit 82 via a mechanical impedance constituted by the inertia of the mirror 20, by the friction and the stiffness of its suspension, and via a circuit 90 for taking account of the signals produced by the rotation sensors associated with the mirror 20. The corrector network 84 serves to reduce and cancel the signal e representing the difference between the signal emitted by the analog function generator and the signal representative of the real motion of, the mirror 20.

Preferably, the center of the optical face of the mirror 20 is situated at the focus of the optical focusing device so that the reflected and focused laser beam remains perpendicular to the part to be treated.

Figure 5:
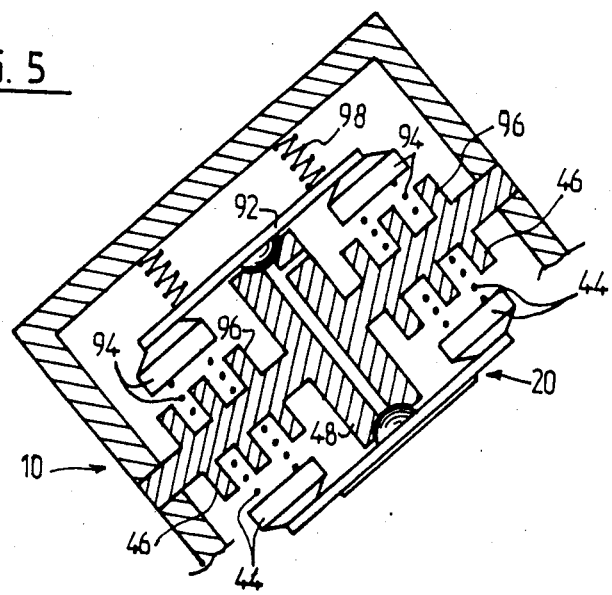
FIG. 5 is a view similar to FIG. 1 showing a variant embodiment.

Reference is now made to FIG. 5 which is a diagram showing a variant embodiment in which the frame 10 includes dynamic balancing means for the moving assembly constituted by the mirror 20 and its coils 44. These means are formed by a moving assembly which is symmetrical to the above-specified assembly and comprises a false mirror 92, identical to the mirror 20 but not provided with an optical face, with four coils 94 identical to the coils 44 fixed to its periphery and axially aligned with the coils 44. Each coil 94 is electrically connected in opposition to the coil 44 with which it is aligned, and co-operates with a magnetic circuit 96 symmetrical to the magnetic circuit 46. Spring return means 98 are associated with the false mirror 92 and tend to return it automatically to its average position. Like the mirror 20, the false mirror 92 includes a central pivot from which it is suspended on a cushion of air at the top end of the riser 48.

In operation, the false mirror 92 is subjected to acceleration forces which are equal and opposite to those to which the mirror 20 is subject, thereby cancelling the effects on the mirror support means of mirror motion and preventing said support means from vibrating.

Figure 6:
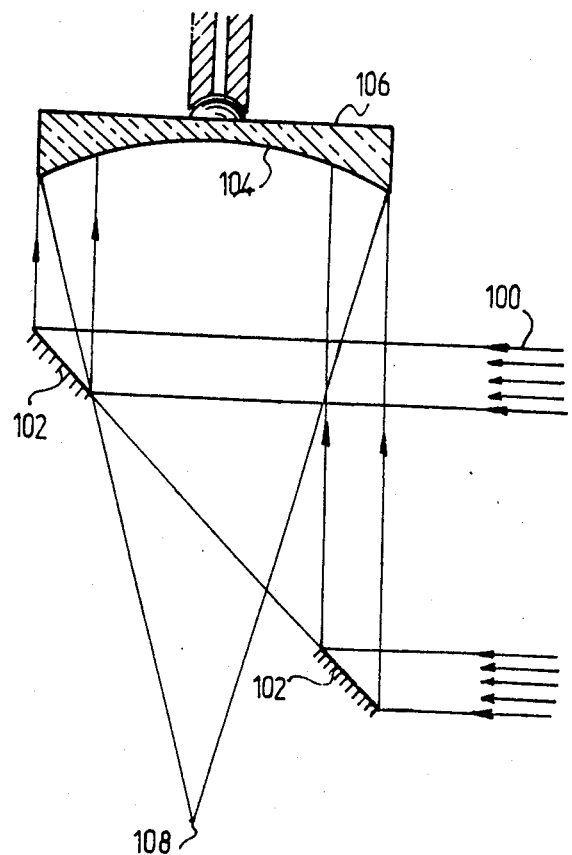
FIG. 6 is a diagram of another variant embodiment.

The mirror 20 may have a plane optical face as shown in FIGS. 1 and 5, or else it may have a concave optical face, if necessary. It is even possible to omit the focusing lenses by using a Cassegrain type of assembly and an annular incident laser beam, as shown in FIG. 6.

In this figure the incident laser beam 100 is annular in section and is reflected by a plane annular mirror 102 onto the concave optical face 104 of a mirror 106 corresponding to the mirror 20. The beam reflected by said optical face 104 is focused at 108.

I claim:

1. A method of displacing the point of impact of a laser beam on a part, the method consisting in directing the laser beam onto a mirror which reflectes it onto the part, and in displacing the mirror support or the part support relative to the other support with a predetermined motion corresponding substantially to the desired trajectory for the beam impact point on the part, characterized in that the method consists in superposing on said motion a small amplitude motion of the mirror (20) relative to its support, in mounting the mirror (20) rotatable about two perpendicular axes (40, 42) which cross at its center, and in determining said small amplitude motion by rotary motion of the mirror (20) about said two axes (40 and 42).

2. A method according to claim 1, characterized in that it consists in suspending the mirror at its center by magnetic attraction and without friction by means of a cushion of air, and in controlling its rotary motion about said axes by varying an electric current flowing through coils (44) fixed to the mirror (20) at points situated on its rotary axes (40, 42) and placed in a fixed magnetic field.

3. A device for displacing the impact point of a laser beam on a part, the device comprising a mirror (20) onto which the laser beam is directed, together with means for displacing the mirror support or the part support relative to the other support with a motion corresponding substantially to the desired trajectory for the laser beam impact point on the part, the device being characterized in that the mirror (20) is mounted to rotate, relative to its support (10), about two perpendicular rotary axes (40, 42) passing through its center, and in that means (44, 80) are provided for displacing the mirror (20) about said two axes with a small amplitude motion which is superposed to the above-specified motion of the mirror support or the part support relative to the other support.

4. A device according to claim 3, characterized in that the mirror (20) is provided at its center with a suspension pivot (34) of the air cushion type, which pivot is subjected to magnetic attraction.

5. A device according to claim 3 or 4, characterized in that the mirror (20) is associated with means (68, 74) preventing its rotation about an axis (30) perpendicular to said rotary axes (40, 42).

6. A device according to claims 3 or 4, characterized in that the mirror (20) includes four arms (38) extending in pairs along the rotary axes (40, 42) and on which coils (44) are fixed symmetrically with their axes perpendicular to the axes of rotation, which coils are movable relative to fixed magnetic circuits (46) carried by the mirror support (10).

7. A device according to claim 6, characterized in that the two coils (44) mounted on a common rotary axis of the mirror are connected in opposition to an electric control circuit.

8. A device according to claims 3 or 4, characterized in that it includes means for measuring the angles of rotation of the mirror about the said axes (40, 42).

9. A device according to claim 8, characterized in that the angle measuring means are linear displacement sensors (66) comprising a moving element guided along an axis which is perpendicular to the two rotary axes of the mirror and carried on a rod (64) which extends axially through one of said coils (44) and is fixed together therewith to the mirror (20).

10. A device according to claim 7, characterized in that the electric control circuit includes an analog function generator (80) associated with a corrector network (84) which is of the proportional-integral-derivative type, for example.

11. A device according to claims 3 or 4, characterized in that it includes dynamic balancing means for the moving assembly constituted by the mirror (20) and its displacement means (44), said balancing means being constituted by a moving assembly (92, 94) which is symmetrical to the said moving assembly (20, 44) and including displacement means identical to those for the mirror (20), but connected in opposition relative thereto.

12. A device according to claim 5 characterized in that the mirror (20) includes four arms (38) extending in pairs along the rotary axes (40, 42) and on which coils (44) are fixed symmetrically with their axes perpendicular to the axes of rotation, which coils are movable relative to fixed magnetic circuits (46) carried by the mirror support (10).

13. A device according to claim 12, characterized in that the two coils (44) mounted on a common rotary axis of the mirror are connected in opposition to an electric control circuit.

14. A device according to claim 13, characterized in that it includes means for measuring the angles of rotation of the mirror about the said axes (40, 42).

15. A device according to claim 14, characterized in that the angle measuring means are linear displacement sensors (66) comprising a moving element guided along an axis which is perpendicular to the two rotary axes of the mirror and carried on a rod (64) which extends axially through one of said coils (44) and is fixed together therewith to the mirror (20).

16. A device according to claim 13, characterized in that the electric control circuit includes an analog function generator (80) associated with a corrector network (84) which is of the proportional-integral-derivative type, for example.

17. A device according to claim 16, characterized in that it includes dynamic balancing means for the moving assembly constituted by the mirror (20) and its displacement means (44), said balancing means being constituted by a moving assembly (92, 94) which is symmetrical to the said moving assembly (20, 44) and including displacement means identical to those for the mirror (20), but connected in opposition relative thereto.

* * * * *